(12) United States Patent
Jager

(10) Patent No.: US 8,407,498 B2
(45) Date of Patent: Mar. 26, 2013

(54) POWER CONTROL USING IN-SITU TEST CIRCUIT TO MEASURE PERFORMANCE CAPABILITY OF PROCESSING CIRCUITRY

(75) Inventor: Mike Jager, Camberley (GB)

(73) Assignee: Nokia Corporation, Espoo (FI)

( * ) Notice: Subject to any disclaimer, the term of this patent is extended or adjusted under 35 U.S.C. 154(b) by 721 days.

(21) Appl. No.: 12/521,063

(22) PCT Filed: Dec. 27, 2006

(86) PCT No.: PCT/IB2006/003820
§ 371 (c)(1),
(2), (4) Date: Feb. 5, 2010

(87) PCT Pub. No.: WO2008/078131
PCT Pub. Date: Jul. 3, 2008

(65) Prior Publication Data
US 2010/0146313 A1 Jun. 10, 2010

(51) Int. Cl.
*G06F 1/32* (2006.01)
(52) U.S. Cl. .......................... 713/320; 702/57
(58) Field of Classification Search .................. 713/320; 702/57
See application file for complete search history.

(56) References Cited

U.S. PATENT DOCUMENTS

| 6,510,400 | B1  | 1/2003 | Moriyama |
| 6,714,890 | B2* | 3/2004 | Dai ............................... 702/132 |
| 7,054,720 | B2  | 5/2006 | Cooper |
| 7,917,772 | B1* | 3/2011 | Koniaris et al. ............... 713/300 |
| 2004/0071184 | A1 | 4/2004 | Naveh et al. |
| 2007/0005152 | A1* | 1/2007 | Karr et al. ....................... 700/22 |

FOREIGN PATENT DOCUMENTS
EP 0632360 A1 1/1995

OTHER PUBLICATIONS

"International Search Report and the Written Opinion of the International Searching Authority", received in corresponding PCT Application No. PCT/IB2006/003820, Dated Aug. 1, 2007, 12 pages.

* cited by examiner

Primary Examiner — Albert Wang
(74) Attorney, Agent, or Firm — Locke Lord LLP

(57) ABSTRACT

A method comprising: sensing an ambient temperature at an electronic apparatus; and switching between a first processing mode of the electronic apparatus and a second processing mode of the electronic device, in response to an increase in the ambient temperature above a threshold.

19 Claims, 5 Drawing Sheets

POWER CONTROL USING IN-SITU TEST CIRCUIT TO MEASURE PERFORMANCE CAPABILITY OF PROCESSING CIRCUITRY

RELATED APPLICATION

This application was originally filed as PCT Application No. PCT/IB2006/003820 filed Dec. 27, 2006.

FIELD OF THE INVENTION

Embodiments of the present invention relate to power control. In particular, they relate to controlling power consumption by selecting one of a plurality of processing modes.

BACKGROUND TO THE INVENTION

There is currently very great interest in reducing power consumption in electronic devices, particularly portable electronic devices. One source of power consumption is processing circuitry.

It is generally undesirable to have processing circuitry operating at full speed and full power irrespective of processing load. It is generally desirable to match the processing power with the processing load so that less power is consumed.

One solution is dynamic voltage and frequency scaling (DVFS). The processing circuitry is arranged so that it can operate at one of a plurality of different power consumption levels. Each power consumption level has its own processing frequency and voltage. The power consumption level that has the lowest power consumption but is still capable of handling a processing load is chosen for use.

BRIEF DESCRIPTION OF THE INVENTION

According to some embodiments of the invention there is provided a method comprising: sensing an ambient temperature at an electronic apparatus; and switching between a first processing mode of the electronic apparatus and a second processing mode of the electronic device, in response to an increase in the ambient temperature above a threshold.

According to some embodiments of the invention there is provided a method an apparatus comprising: an ambient temperature sensor for sensing ambient temperature; processing circuitry having a first processing mode and a second, different, processing mode; and a controller for selecting the processing mode of the processing circuitry in response to the sensed ambient temperature.

According to some embodiments of the invention there is provided a computer program comprising computer program instructions which when loaded into a processor enable the processor to control switching of processing circuitry between a first processing mode and a second, different, processing mode, in response to an input indicating an ambient temperature.

According to some embodiments of the invention there is provided a method comprising: sensing an ambient temperature at an electronic apparatus; estimating total power consumption of a first processing mode of the electronic apparatus when processing a defined load at the sensed ambient temperature; estimating total power consumption of a second, different, processing mode of the electronic apparatus when processing the defined load at the sensed ambient temperature; and selecting the processing mode with the lowest estimated power consumption when processing the defined load at the sensed ambient temperature According to some embodiments of the invention there is provided a method comprising: detecting a characteristic of processing circuitry; estimating total power consumption of a first processing mode of the processing circuitry, when processing a defined load, using the detected characteristic; estimating total power consumption of a second processing mode of the processing circuitry, when processing a defined load, using the detected characteristic; and selecting the processing mode based on the estimated total power consumptions for the first processing mode and the second processing mode.

The detected characteristic may be one that is related to leakage current in the processing circuitry. A detected characteristic may be the performance of the processing circuitry which is typically related to leakage current.

BRIEF DESCRIPTION OF THE DRAWINGS

For a better understanding of the present invention reference will now be made by way of example only to the accompanying drawings in which:

FIGS. 3A and 3C illustrate how total power consumption T varies with temperature and processing circuitry characteristics.

DETAILED DESCRIPTION OF EMBODIMENTS OF THE INVENTION

Semiconductor devices may have different geometries e.g. 65/45/32 nm.

For a given geometry there are different process varieties such as low power (LP), general purpose (GP) or high performance (HP). These semiconductor processes have different transistor threshold voltages (Vt). A low threshold voltage results in high performance and high leakage current for a given geometry and supply voltage. A higher threshold voltage results in lower performance but also lower leakage current for a given geometry and supply voltage. It is not normally possible to have devices that have higher leakage and lower performance or devices that have lower leakage and higher performance i.e. there is typically a strong correlation between performance and leakage current—the higher the performance, the higher the leakage.

For a given semiconductor process, manufacturing variations may result in variations in leakage current and performance, but there remains the same strong correlation between performance and leakage current.

The inventors have realized that a measurement of the performance of a semiconductor circuit therefore indicates its leakage current which, as explained, is dependent upon multiple variables some or all of which may be unknown.

Implementations of the same design of processing circuitry may have different leakage because different semiconductor processes have been used.

Implementations of the same design of processing circuitry may have different leakage even if the same semiconductor processes have been used because of manufacturing variations or variations in the properties of the semiconductor used.

The power dissipated by leakage currents depends on the factors described in the preceding paragraphs and also has a strong dependence on temperature.

Figure 1:
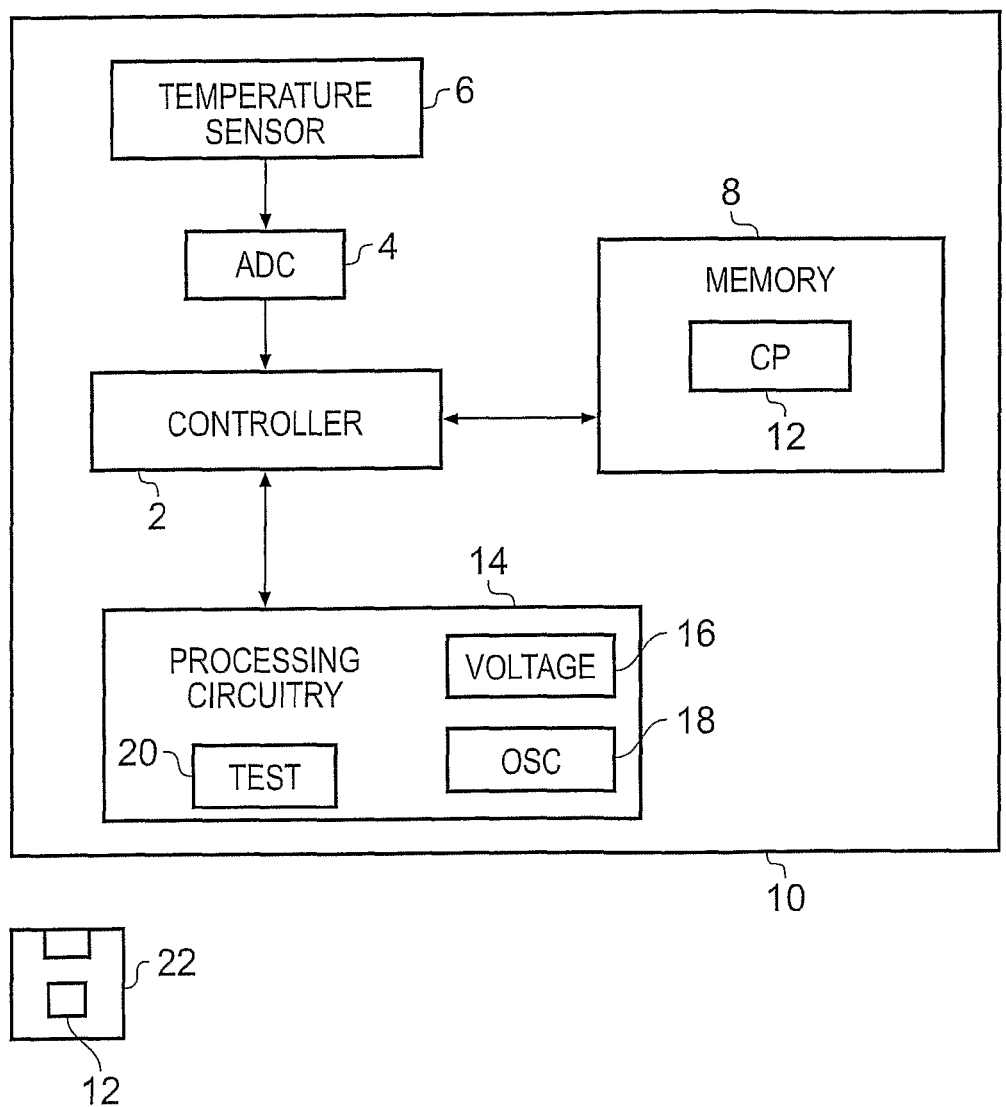
FIG. 1 schematically illustrates an apparatus comprising: an ambient temperature sensor, processing circuitry and a controller.

FIG. 1 schematically illustrates an apparatus 10 comprising: an ambient temperature sensor 6, processing circuitry 14 and a controller 2.

The apparatus is an electronic device. It may, for example, be a hand-portable electronic device such as a mobile cellular telephone, a personal music player, an electronic book reader, a personal digital assistant, a gaming device etc.

In this example, the controller 2 is provided by a computer comprising a programmable processor 2 and memory 8. The processor 2 is arranged to read from and write to the memory 8. The memory 8 stores a computer program 12, which when loaded in the processor 2 enables it to perform the functions of the controller. In other examples, the controller 2 may be provided by dedicated hardware or firmware. It may for example, in some embodiments, be incorporated within the processing circuitry 14.

In this example, the ambient temperature sensor 6 is an analogue sensor such as a thermistor mounted on a printed wiring board (PWB). An analogue to digital converter (ADC) 4 is used to convert the analogue temperature value to a digital temperature value which is then processed by controller 2. The PWB typically carries the temperature sensor 6, ADC 4, processor 2, memory 8 and processing circuitry 14.

The processing circuitry 14 is typically an integrated circuit (IC). ICs typically comprise a semiconductor (e.g. silicon, germanium, gallium arsenide etc) substrate that has electronic circuits integrated on or within the semiconductor. One type of IC is the silicon CMOS IC. Embodiments of the invention find particular utility with ICs with 65 nm and below process geometries.

The processing circuitry 14, in one embodiment, comprises a programmable voltage regulator 16 and adaptive voltage scaling (AVS) oscillator 18. The processing circuitry 14 may also comprise test circuitry 20.

The processing circuitry 14 may be dedicated to a particular purpose or purposes. It may be an application specific integrated circuit (ASIC).

For example, the processing circuitry may be designed for decoding and/or encoding. It may, for example, be used to process a mobile cellular voice call and/or be used for music playback and/or be used for video playback.

The controller 2 is operable to select a processing mode for the processing circuitry 14. The selection depends upon the ambient temperature and the processing load for the processing circuitry 14. Thus the processing mode may change when the sensed ambient temperature changes and/or the processing load changes.

The processing circuitry 14 has a series of first processing modes and a second, different, processing mode.

Each of the plurality of first processing modes is a continuous processing mode that is suitable for processing a different load. Each of the first processing modes is suitable for a different discrete processing load level. The first processing modes each have a different periodic clock signal 32 as illustrated in FIG. 2A and hence a different power consumption.

For each of the first processing modes, the processing clock signal 32 provided by oscillator 18 is continuous on a macro-scale (i.e. there are no discontinuities in its periodicity) and has a different periodic clock rate on the micro-scale. That is the processing clock signals for the first processing modes are regularly periodic.

The first processing modes may be implemented as a dynamic voltage and frequency scaling (DVFS) mode as is known in the art. Each different first processing mode may have a different voltage and operational frequency as indicated in the table below.

Figure 2A:
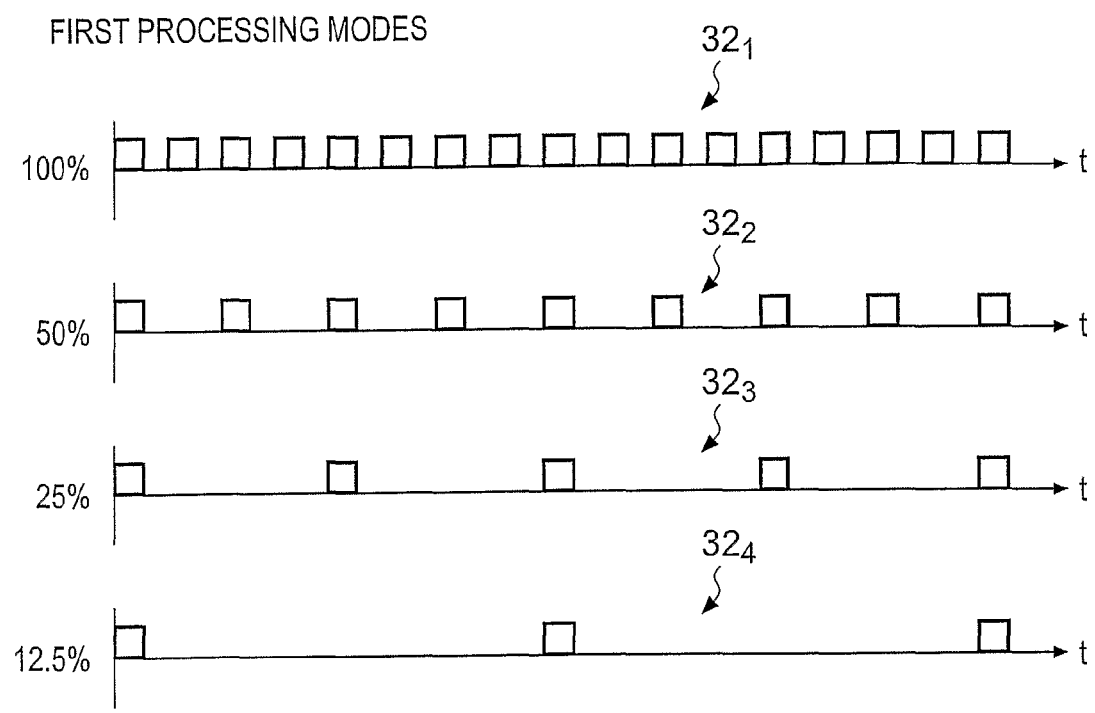
FIG. 2A illustrates periodic clock signals for a plurality of first processing modes.

| % Frequency | Voltage | Reference in FIG. 2A |
|---|---|---|
| 100 | 1.2 | $32_1$ |
| 50 | 1.05 | $32_2$ |
| 25 | 0.9 | $32_3$ |
| 12.5 | 0.8 | $32_4$ |

It will of course be appreciated that the higher the voltage/frequency the higher the power consumption.

The second processing mode is a discontinuous processing mode with a power consumption that varies with the processing load.

Figure 2B:
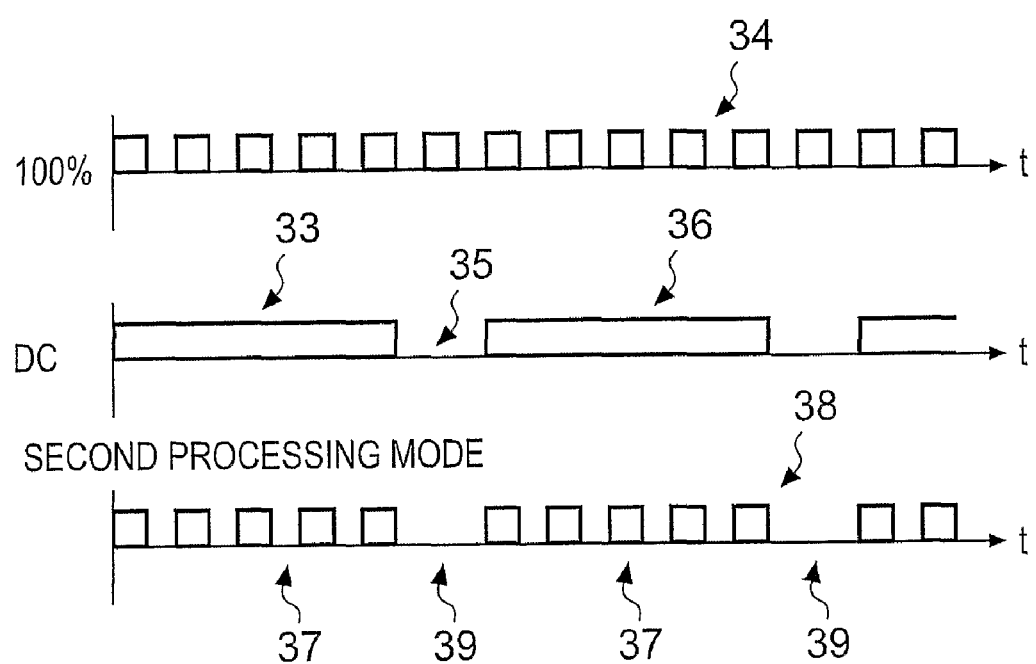
FIG. 2B illustrates a clock signal for the second processing mode and also its component fixed base clock signal and variable duty cycle.

The second processing mode is a discontinuous (intermittent) processing mode that is suitable for processing different loads. The second processing mode has a different clock signal 38 as illustrated in FIG. 2B that can be considered to be an AND combination of a fixed base clock signal 34 and a variable duty cycle 36.

The duty cycle has 'on' portions 33 and 'off' portions 35. The ratio of the on/off portions is continuously variable under control of controller 2. The second processing mode can operate with a plurality of different duty cycles and hence different power consumptions. The duty cycle 33 may be adjusted to match the processing load. As the processing load reduces the duty cycle will remain off for longer periods which saves power.

During the 'off' portion 35, the apparatus 10 may be switched to a low power consumption mode in which, for example the power and clock are shut down completely during the periods 35. Thus, during the second processing mode, the apparatus 10 operates in distinct bursts. During the 'off' periods there is consequently no leakage current.

For the second processing mode, the processing clock signal 38 provided by oscillator 18 is discontinuous on a macro-scale (i.e. there are discontinuities 39 in its periodicity) and has a constant fast periodic clock rate on the micro-scale. That is the processing clock signals for the second processing mode are regularly periodic but only for discrete portions 37 separated by discontinuities 39.

The duration of the discrete portion 37 of regular periodicity and the duration of the discontinuities 39 are controlled by the duty cycle 36.

The regular periodicity is controlled by the base clock signal 34, which in this example is equivalent to the clock signal $32_1$.

The controller 2 uses a model for power consumption for the first processing modes and for the second processing mode. This model takes account of the processing load, the ambient temperature and the characteristics of the processing circuitry 14 itself. The model, in particular, evaluates the power consumption associated with leakage current within the processing circuitry 14 as an apparatus specific value corrected for temperature.

The total power T consumed during a processing mode is dependent upon the power consumed performing operations O(L) and the power consumed due to inefficiencies W(L,T) including leakage currents.

The total power T is not a fixed constant but depends on load and temperature and also factors associated with the processing circuitry 14 such as the semiconductor used, the process used, the geometry used, manufacturing variations etc. The determination of what processing mode is most appropriate when therefore depends upon characteristics of the processing circuitry 14, the load and the temperature.

The power consumed by inefficiencies may be modeled as the power dissipated by leakage current which has an exponential dependence on temperature and dependency on performance. High performance silicon has high leakage and low performance silicon has low leakage.

First Processing Modes

For the first processing modes, let the maximum selectable voltage be Vmax and let V(L) be the voltage that would be selected for a processing load L.

Referring back to the table above, Vmax is 1.2V and V(L) =1.2 for L>50% maximum load, V(L)=1.05 for 25% maximum load<L≦50% maximum load, V(L) is 0.9 for 12.5% maximum load<L≦25% maximum load, V(L) is 0.8 for L≦12.5% maximum load.

$k_1$ is a load L dependent correction factor defined by:

$$k_1(L)=V(L)/V\text{max} \qquad \text{Equation 1}$$

The operational power is modeled as:

$$O(L)=O_o(L)*(k_1(L))^2 \qquad \text{Equation 2}$$

$O_o(L)$ is the typical power for the load L and is read from a look-up table in memory 8.

The leakage power is modeled as:

$$W(L,T)=X*I(T)*k_1(L)^m \qquad \text{Equation 3}$$

where X is a value representing device dependent power dissipation by leakage currents and I is a temperature dependent correction factor and m is typically 3 but may vary for different designs of processing circuitry.

The value of X may be read from memory 8 having been previously stored there during manufacturing and production testing or determined in-situ. For in-situ determination, an internal test circuit 20 is used to measure the inherent performance capability of the processing circuitry 14. The test circuit 20 may, for example, measure the frequency of a free running oscillator or a delay in a delay line built from combinational logic components. The test circuitry need not be dedicated circuitry that is present only for testing but it could be circuitry that is re-used for a different purpose, for example, the oscillator 18.

If X is the actual leakage power, $X_o$ is the typical leakage power, $f_m$ is the measured oscillator frequency and $f_o$ is the typical oscillator frequency then one expression for the leakage power is:

$$X=X_o*(f_m/f_o)^N \qquad \text{Equation 4}$$

where N is a real number such as, for example, 2.

The temperature dependent correction factor I is given by:

$$I=I_o*(1+c)^{T-T_o} \qquad \text{Equation 5}$$

where I is the leakage current at temperature T, $I_o$ is the leakage current at temperature $T_o$, and c is a coefficient e.g. c may typically be about 0.03. The coefficient c is dependent upon the type of silicon process used in the processing circuitry and its geometry (65/45/32 nm).

The total power for the first modes is therefore given by:

$$T=O(L)+W(L,T)=>T=O_o*k_1^2+X*I*k_1^3 \qquad \text{Equation 6}$$

The load dependent parameters are $O_o$ and $k_1$ and the temperature dependent parameter is I.

Second Processing Modes

For the second processing mode, let's define $k_2$ as a load L dependent correction factor that is proportional to the duty cycle Γ36.

$$k_2(L)=\Gamma \qquad \text{Equation 7}$$

The operational power is modeled as:

$$O(L)=O_o(L)*(k_2(L)) \qquad \text{Equation 8}$$

where $O_o(L)$ is the typical power for the load L read from a look-up table in memory 8.

The leakage power is modeled as:

$$W(L,T)=X*I(T)*k_2(L) \qquad \text{Equation 9}$$

and the total power for the second mode is therefore given by:

$$T=O_o*k_2+X*I*k_2 \qquad \text{Equation 10}$$

The load dependent parameters are $O_o$ and $k_2$ and the temperature dependent parameter is I.

Figure 3A:
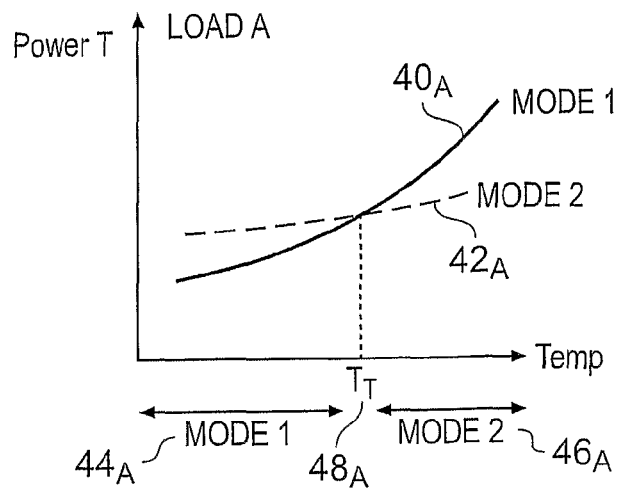
FIGS. 3A and 3B illustrate how total power consumption T varies with temperature and load.
Figure 3B:
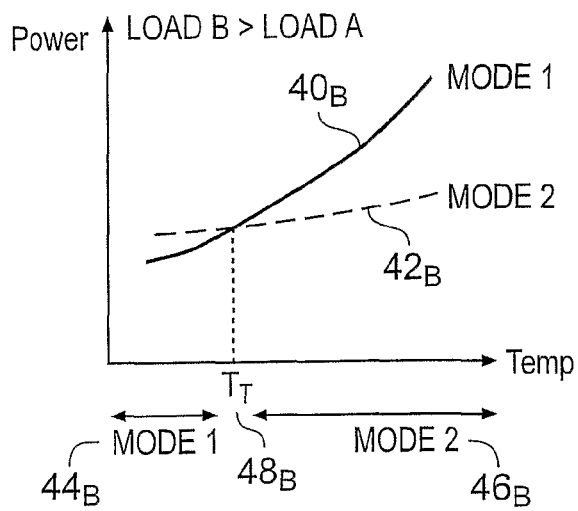

FIGS. 3A and 3B illustrate how total power consumption T varies with temperature and load.

The trace 40$_A$ in FIG. 3A illustrates how the total power T, for the first processing mode, varies with temperature when the processing load is A.

The trace 40$_B$ in FIG. 3B illustrates how the total power T, for the first processing load, varies with temperature when the processing load is B. In the illustrated example, the increase in processing load from load A to load B is sufficient to discretely increase V(L) to the next level (next first processing mode) and hence produce a step-change in $K_1(L)$. This results in a discrete jump in the total power T between FIGS. 3A and 3B for the first processing modes.

The trace 42$_A$ in FIG. 3A illustrates how the total power T, for the second processing mode, varies with temperature when the processing load is A. The trace 42$_B$ in FIG. 3B illustrates how the total power T, for the second processing load, varies with temperature when the processing load is B. In the illustrated example, the increase in processing load from load A to load B causes a linear increase in the duty cycle D and hence a linear increase in $k_2$. This results in a small increase in the total power T between FIGS. 3A and 3B for the second processing mode.

It will be appreciated that in FIG. 3A, there is a temperature threshold value $T_T$ where the traces 40$_A$ and 42$_A$ cross. At temperatures below the threshold value 48$_A$, the first mode is more power efficient than the second processing mode and will be used in the temperatures range 44$_A$. At temperatures above the threshold value, the second mode is more power efficient than the first processing mode and will be used in the temperatures range 46$_A$.

In FIG. 3B, there is a temperature threshold value $T_T$ where the traces 40$_B$ and 42$_B$ cross. This threshold is different to that in FIG. 3A as it is load dependent. At temperatures below the threshold value 48$_B$, the first mode is more power efficient than the second processing mode and will be used in the temperatures range 44$_B$. At temperatures above the threshold value, the second mode is more power efficient than the first processing mode and will be used in the temperatures range 46$_B$.

The traces in FIGS. 3A and 3B are also dependent upon factors associated with the processing circuitry 14 such as the semiconductor used, the process used, the geometry used, manufacturing variations etc. This dependency is illustrated in a comparison of FIGS. 3A and 3C.

Figure 3C:
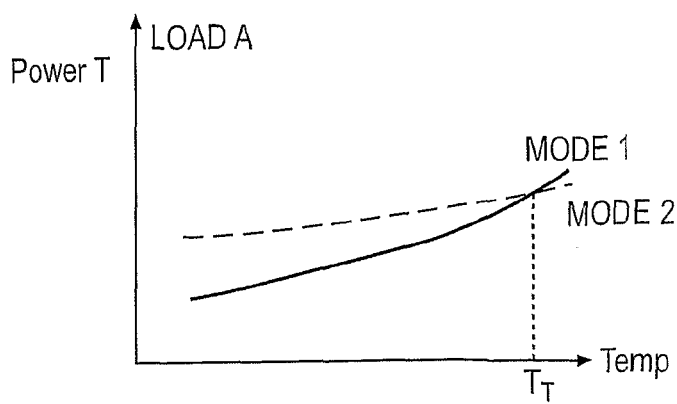

FIG. 3A illustrates how the total power consumption for the first processing mode and second processing mode varies with temperature when first processing circuitry, which has been manufactured according to a first silicon process, processes load A. FIG. 3C illustrates how the total power consumption for the first processing mode and second processing mode varies with temperature. The second processing circuitry has been manufactured according to the same design as the first processing circuitry and processes the same load A. However the second processing circuitry has been manufactured according to the first silicon process, but with a manufacturing variation, or has been manufactured according to a second different silicon process. The silicon manufactured according to the first process (FIG. 3A) is higher performance than that of the second processing circuitry (FIG. 3B). The higher performance silicon has higher leakage and greater power consumption and a lower threshold temperature.

The controller 2 dynamically selects the most power efficient processing mode. The controller 2 controls switching from the second processing mode to the first processing mode, in response to a decrease in the ambient temperature below the dynamic threshold. The controller 2 controls switching from the first processing mode to the second processing mode, in response to an increase in the ambient temperature above the dynamic threshold.

Figure 4:
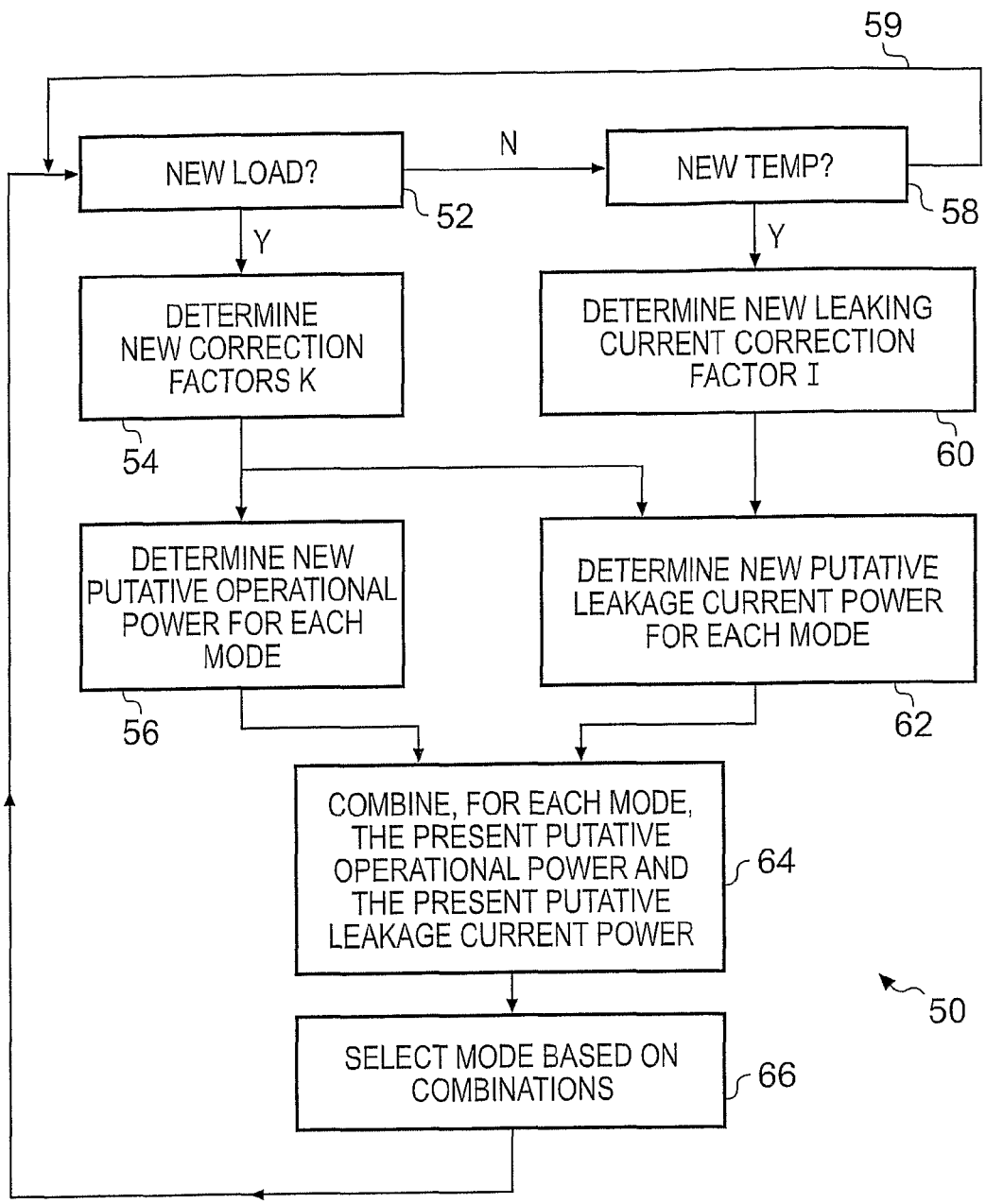
FIG. 4 schematically illustrates a process for selecting between use of a first processing mode and a second processing mode based on estimates of their power consumption at an ambient temperature.

An example of a process 50 that is performed by controller 2 is schematically illustrated in FIG. 4. In the process 50, a series of interconnected blocks are illustrated. The blocks may be considered as steps in a method or code portions in a computer program 12.

At block 52, in loop 59, a test is performed to determine if the processing load has changed. If the load has not changed the process moves to block 58. If the processing load has changed then loop 59 is interrupted and block 54 is entered.

At block 54, it is determined which one of the first processing modes that is capable of handling the processing load has the lowest power consumption and this first processing mode is set as a putative first processing mode. The load dependent correction factor $k_1(L)$ is then calculated according to Equation 1. The minimum duty cycle required for the second processing mode to handle the processing load is also determined defining a putative second processing mode and the load dependent correction factor $k_2(L)$ is then calculated according to Equation 7.

The processes then moves to perform blocks 56 and 62 in parallel.

At block 58, a test is performed to determine if the temperature has changed or changed by a predetermined value. If the temperature has not changed the process returns to block 52 via loop 59. If the temperature has changed then loop 59 is interrupted and block 60 is entered.

At block 60, the temperature dependent correction factor I is determined according to Equation 5 using the newly sensed temperature. The process then moves to block 62.

At block 62, the power W dissipated by the leakage current for the putative first mode is estimated using Equation 3 and for the putative second mode using Equation 9.

At block 56, the operational power O is calculated for the putative first processing mode according to Equation 2 and for the putative second processing mode according to Equation 8.

Then at block 64, the power W dissipated by the leakage current for the putative first mode and the operational power O for the putative first mode are combined to estimate the total power T for the first mode according to Equation 6. The power W dissipated by the leakage current for the putative second mode and the operational power O for the putative second mode are combined to estimate the total power T for the second mode according to Equation 10.

Then at block 66, one of the putative first processing mode and the putative second processing mode is selected. If the total power T for the first mode is greater than the total power T for the second mode then the second mode is selected. If the total power T for the second mode is greater than the total power T for the first mode then the first mode is selected.

After block 66 the process returns to loop 59.

Referring back to FIG. 1, the memory 8 stores computer program instructions 12 that control the operation of the apparatus 10 when loaded into the processor 2. The computer program instructions 12 provide the logic and routines that enables the electronic device to perform the methods illustrated in FIG. 4.

The computer program instructions, when loaded into the processor 2, enable the processor 2 to control switching of processing circuitry 14 between a first processing mode and a second, different, processing mode, in response to an input indicating an ambient temperature.

The computer program instructions may arrive at the apparatus 10 via an electromagnetic carrier signal or be copied from a physical entity 22 such as a computer program product, a memory device or a record medium such as a CD-ROM or DVD.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
sensing an ambient temperature at an electronic apparatus;
measuring performance capability of processing circuitry of the apparatus using an in-situ test circuit associated with the processing circuitry; and
switching between a first processing mode of said electronic apparatus and a second processing mode of said electronic apparatus, said method further comprising:
a) estimating total power consumption of the first processing mode of the processing circuitry when processing a defined load at a sensed ambient temperature, using the measured performance capability;
b) estimating total power consumption of the second processing mode of the processing circuitry, when processing the defined load at the sensed ambient temperature, using the measured performance capability; and
c) selecting the processing mode with the lower estimated power consumption when processing the defined load at the sensed ambient temperature.

2. A method as claimed in claim 1, wherein the estimated total power consumption in the first processing mode is temperature dependent and estimated total power consumption in the second processing mode is separately temperature dependent.

3. A method as claimed in claim 1, further comprising repeating steps a), b) and c) when the sensed ambient temperature changes.

4. A method as claimed in claim 1, wherein the selection is dependent upon the sensed ambient temperature.

5. A method as claimed in claim 1, further comprising repeating steps a), b) and c) when the defined load changes.

6. A method as claimed claim 1, wherein the selection is dependent upon the defined load.

7. A method as claimed in claim 1, further comprising modeling a leakage current within the electronic apparatus and using said model to estimate the power dissipated by the leakage current.

8. A method as claimed in claim 7, wherein the power dissipated by the leakage current is a device specific value corrected for temperature.

9. A method as claimed in claim 1, further comprising:
detecting a characteristic of processing circuitry;
estimating total power consumption of a first processing mode of the processing circuitry, when processing a defined load, using the detected characteristic;
estimating total power consumption of a second processing mode of the processing circuitry, when processing a defined load, using the detected characteristic; and
selecting the processing mode based on the estimated total power consumptions for the first processing mode and the second processing mode.

10. An apparatus comprising:
an ambient temperature sensor for sensing ambient temperature;
processing circuitry having a first processing mode and a second, different, processing mode;
an in-situ test circuit associated with the processing circuitry, configured to measure performance capability of the processing circuitry; and
a controller for selecting the processing mode of the processing circuitry in response to the sensed ambient temperature, using the measured performance capability, wherein the controller is operable to:
a) estimate total power consumption of the first processing mode of the processing circuitry when processing a defined load at a sensed ambient temperature, using the measured performance capability;
b) estimate total power consumption of the second processing mode of the processing circuitry, when processing the defined load at the sensed ambient temperature, using the measured performance capability; and
c) select the processing mode with the lower estimated power consumption when processing the defined load at the sensed ambient temperature.

11. An apparatus as claimed in claim 10, wherein the controller is operable to select a processing mode when the sensed ambient temperature changes.

12. An apparatus as claimed in 10, wherein the controller is operable to select a processing mode when the defined load changes.

13. An apparatus as claimed in claim 12, wherein the controller is operable to use a model of a leakage current within the processing circuitry to estimate the power dissipated by the leakage current.

14. An apparatus as claimed in claim 13, wherein the power dissipated by the leakage current is a device specific value corrected for temperature.

15. An apparatus as claimed in claim 10, wherein the first processing mode is a continuous processing mode.

16. An apparatus as claimed in claim 10, wherein the first processing mode is one of a plurality of selectable modes each mode having a different clock rate.

17. An apparatus as claimed in claim 10, wherein the second processing mode is a discontinuous processing mode.

18. An apparatus as claimed in claim 10, wherein the first processing mode is one of a plurality of selectable modes each mode having a different duty cycle.

19. A method comprising:
measuring performance capability of processing circuitry, using an in-situ test circuit associated with the processing circuitry;
estimating total power consumption of a first processing mode of the processing circuitry, when processing a defined load, using the measured performance capability;
estimating total power consumption of a second processing mode of the processing circuitry, when processing a defined load, using the measured performance capability; and
selecting the processing mode based on the estimated total power consumptions for the first processing mode and the second processing mode.

* * * * *